United States Patent
Annamaneni et al.

(10) Patent No.: US 9,679,475 B1
(45) Date of Patent: Jun. 13, 2017

(54) SYSTEM AND METHOD FOR SMART, RATIONAL AND COLLABORATIVE LOCATION TRACKING FOR TRIP PLANNERS

(71) Applicant: Xerox Corporation, Norwalk, CT (US)

(72) Inventors: Narendra Annamaneni, Andhra Pradesh (IN); Raja Subramaniam T, Tamil Nadu (IN); Narayanan Unny Edakunni, Bangalore (IN); Mohammed Feroz Aashik Salim, Tamil Nadu (IN)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/090,892

(22) Filed: Apr. 5, 2016

(51) Int. Cl.
  *G08G 1/01* (2006.01)
  *G01C 21/34* (2006.01)

(52) U.S. Cl.
  CPC ......... *G08G 1/012* (2013.01); *G01C 21/3423* (2013.01)

(58) Field of Classification Search
  CPC .......................... G08C 1/012; G01C 21/3423
  USPC ....................................................... 701/117
  See application file for complete search history.

(56) References Cited

U.S. PATENT DOCUMENTS

| | | | |
|---|---|---|---|
| 5,491,486 A | 2/1996 | Welles, II et al. | |
| 6,226,622 B1 | 5/2001 | Dabbiere | |
| 6,292,748 B1 | 9/2001 | Harrison | |
| 6,339,397 B1 | 1/2002 | Baker | |
| 7,408,506 B2 | 8/2008 | Miller | |
| 7,702,370 B2 | 4/2010 | Persico | |
| 7,822,564 B2 * | 10/2010 | Davis | H04W 4/02 702/60 |
| 8,059,029 B2 | 11/2011 | Juang | |
| 8,199,974 B1 * | 6/2012 | Prada Gomez | G06K 9/00671 382/103 |
| 8,688,795 B2 | 4/2014 | Hill | |
| 8,788,804 B2 * | 7/2014 | Nagaraja | G06F 21/606 713/151 |
| 8,930,458 B2 | 1/2015 | Lewis | |
| 9,044,171 B2 | 6/2015 | Venkatraman et al. | |
| 9,225,748 B2 | 12/2015 | Bridge et al. | |

(Continued)

OTHER PUBLICATIONS

Knuth, J. et al., "Distributed collaborative localization of multiple vehicles from relative pose measurements," 47th Annual Allerton Conference on Communication, Control, and Computing (2009) Monticello, IL, Sep. 30-Oct. 2, pp. 314-321.

(Continued)

*Primary Examiner* — McDieunel Marc
*Assistant Examiner* — James E Stroud
(74) *Attorney, Agent, or Firm* — Kermit D. Lopez; Luis M. Ortiz; Ortiz & Lopez, PLLC

(57) ABSTRACT

Methods and systems for collaborative location tracking. Commuters can be organized into a group according to commuter client devices (e.g., smartphones, tablet computing devices, etc.) respectively associated with the commuters. The commuter client devices are tracked as a group rather than individually and based on power efficient context-aware location data derived from the commuter client devices and a generated trip plan in association with data indicative of real-time dynamics so that power usage of individual commuter client devices is rationally minimized.

20 Claims, 5 Drawing Sheets

(56) References Cited

U.S. PATENT DOCUMENTS

| | | | | |
|---|---|---|---|---|
| 2003/0148773 | A1* | 8/2003 | Spriestersbach | G06Q 10/10 455/456.1 |
| 2003/0148775 | A1* | 8/2003 | Spriestersbach | G06Q 10/10 455/456.1 |
| 2011/0002295 | A1* | 1/2011 | Ghosal | H04W 36/0055 370/331 |
| 2011/0202393 | A1 | 8/2011 | DeWakar et al. | |
| 2012/0215594 | A1 | 8/2012 | Gravelle | |
| 2012/0310504 | A1 | 12/2012 | DuHadway et al. | |
| 2013/0142387 | A1* | 6/2013 | Gomez | G02B 27/017 382/103 |
| 2014/0195256 | A1* | 7/2014 | Wagner | G06Q 50/22 705/2 |
| 2014/0195257 | A1* | 7/2014 | Perkins | G06Q 30/04 705/2 |
| 2015/0005011 | A1* | 1/2015 | Nehrenz | H04W 4/02 455/456.3 |

OTHER PUBLICATIONS

Bluetooth low energy—Wikipedia, the free encyclopedia, printed Jan. 27. 2016, 12 pages.

Yu, B., et al., "Bluetooth Low Energy (BLE) Based Mobile Electrocardiogram Monitoring System," Proceeding of the IEEE International Conference on Information and Automation (2012) Shenyang, China, Jun., pp. 763-767.

Ekambaram, V. N. et al., "Distributed High Accuracy Peer-to-Peer Localization in Mobile Multipath Environments," Global Telecommunications Conference (2010) Miami, FL, Dec. 6-10, pp. 1-5.

Vukadinovic, V. et al., "Performance of Collaborative GPS Localization in Pedestrian Ad Hoc Networks," MobiOpp 12, Zurich, Switzerland, Mar. 15-16, 2012, pp. 45-52.

Johnson, J. et al., "Ultra-Wideband Aiding of GPS for Quick Deployment of Anchors in a GPS-denied Ad-hoc Sensor Tracking and Communication System," Proceedings of the 24th International Technical Meeting of the Satellite Division of the Institute of Navigation (2011) Portland, Oregon, Sep. 20-23, pp. 3959-3966.

Galeana-Zapien, H. et al., "Mobile Phone Middleware Architecture for Energy and Context Awareness in Location-Based Services," Sensors (2014) 14:23673-23696.

Chan, L.-W. et al., "Collaborative Localization: Enhancing WiFi-Based Position Estimation with Neighborhood Links in Clusters," 4th International Conference, Pervasive (2006) Dublin, Ireland, May 7-10, pp. 50-66.

Barreira, A. et al., "Collaborative Localization of Mobile Users with Bluetooth: Caching and Synchronisation," SIGBED Review (2012) 9(3):29-31.

Mirza, D. et al., "Real-time Collaborative Tracking for Underwater Networked Systems," WUWNet '12, Los Angeles, California, Nov. 5-6, 2012, 8 pages.

Zhang, P. et al., "Locale: Collaborative Localization Estimation for Sparse Mobile Sensor Networks," IPSN '08 International Conference on Information Processing in Sensor Networks (2008) St. Louis, MO, Apr. 22-24, pp. 195-206.

* cited by examiner

SYSTEM AND METHOD FOR SMART, RATIONAL AND COLLABORATIVE LOCATION TRACKING FOR TRIP PLANNERS

TECHNICAL FIELD

Embodiments are generally related to the field of multi-model trip planning. Embodiments also relate to GPS (Global Positioning System) enabled mobile devices such as smartphones and mobile tablet computing devices.

BACKGROUND

In the era of urbanization, a Multi-Modal Trip Planner (MMTP) is becoming essential to enabling optimized travel plans for the mobility needs of people. Increased traffic on roads affects commuting time and renders public transport schedules unpredictable. Hence, a travel plan generated by an MMTP based on static public transport schedules is inefficient and even obsolete. Besides, the rise of on-demand transportation services such as super shuttles, car-pooling, and shared rides provides better transportation options for commuters and adds more complexity to the MMTP, as these services do not have any schedules and are dynamically provided based on commuter request.

To handle the complexity and to provide better travel plans to the users, an MMTP needs to be "smart" enough to generate adaptive trip plans based on real-time dynamics such as the position of the commuters, public transports, on-road traffic, and on-demand transport services availability. Such a smart MMTP needs to track a commuter's geo position continuously to provide efficient adaptive travel plans and considering real-time dynamics. In the case of on-demand services, such tracking of commuters becomes more important so as to provide live information to co-commuters for better coordination among themselves and to enable additional features.

In addition, commuters willingly request MMTP to track their locations continuously and share it with friends and family for safety reasons or log it for simple travel journal bookkeeping. Modern smartphones can continuously track the commuter's location as he or she moves utilizing a GPS/GLONASS system and suffice the need of MMTP.

Such live tracking capability, however, implements a power hungry operation and can drain the battery of a smartphone or other portable computing device quite rapidly, which is a serious challenge.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a system and method for grouping and collaboratively tracking commuters based on a trip play and real-time dynamics.

It is another aspect of the disclosed embodiments to provide for a reduction in the battery usage of a commuter's computing device, such as a smartphone, tablet computer, or other portable computing device.

The aforementioned aspects and other objectives and advantages can now be achieved as described herein. Methods and systems for collaborative location tracking are disclosed. Commuters can be organized into a group according to commuter client devices (e.g., smartphones, tablet computing devices, etc.) respectively associated with the commuters. The commuter client devices are tracked as a group rather than individually based on power efficient context-aware location data derived from the commuter client devices and a generated trip plan in association with data indicative of real-time dynamics so that power usage of individual commuter client devices is rationally minimized.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
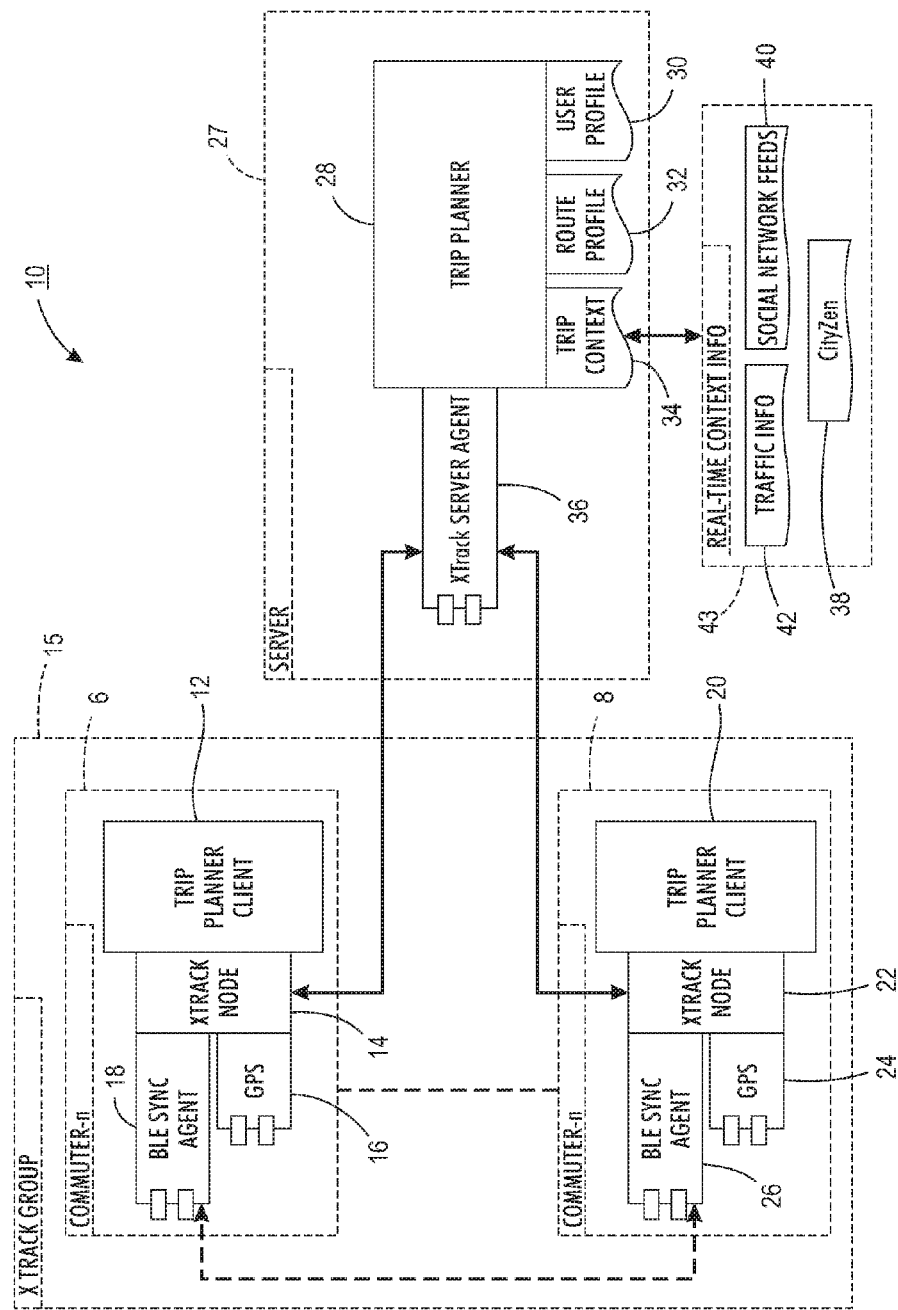
FIG. 1 illustrates a block diagram depicting the high-level architecture of a system that includes one or more nodes capable of forming groups and interacting with a server, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In an example embodiment, a two-pronged optimization approach can be implemented, which is referred to as XTrack. This approach—XTrack—takes advantage of situations in which people share all or a part of their itinerary when travelling together (e.g., travelling in the same bus or the same shared ride). They can be grouped together and tracked as a group rather than individuals. Thus, commuters in a group can take turns tracking and logging their location. This approach further takes advantage of having prior information available regarding individual commuter's travel plans in a group and data indicative of the real-time dynamics of a city's transportation system. Such information and data can be utilized to create a list of strategic tracking checkpoints for the group. The group need only track and log their locations at these checkpoints and not continuously.

This approach includes the use of two important components, a server and a node. Such a server can be referred to as an X-Track server and the node can be referred to as an X-track node. The server can be implemented as a server component of an overall system that generates optimal grouping data and tracking data for commuters. Such a server can be plugged into any trip planner application or travel journal server application. The node can be implemented as a mobile component of the system (e.g., present in a Smartphone, mobile tablet computing device, etc.) that actually creates an ad-hoc group with other commuters and implements the optimal tracking plan provided by the server. The node can be plugged into any trip planner or travel journal mobile application or "app".

When a commuter requests a node to initiate a tracking operation, the node begins tracking individually and searches for nearby nodes (e.g., XTrack nodes) periodically utilizing a wireless personal area network such as, for example (but not limited to), BLE (Bluetooth Low Energy) wireless communications technology. BLE, also marketed as Bluetooth Smart, is a wireless personal area network technology designed and marketed by the Bluetooth Special Interest Group. Compared to "Classic Bluetooth," BLE or Bluetooth Smart is intended to provide considerably reduced power consumption and cost while maintaining a similar communications range. Mobile operating systems including iOS, Android, Windows Phone, Blackberry, OS X, Linux, and Windows 8 can natively support BLE.

As the node comes into proximity with other nodes, it sends information regarding neighbors to the server, which then finds the optimal group for the node to join and generates a list of tracking checkpoints, based on the trip plan and real-time dynamics. The server can also create a smart group-tracking plan for the group. The generated plan contains the order and the amount of contribution each node has to impart to the group.

The amount of contribution of each node is based on ABP (Affordable Battery Power) constraints and an SRC (System Rationality Constraint) of each node. ABP ensures that a node with higher battery power will contribute more to the group whereas SRC ensures that the node that contributes more in a group will be compensated in another group and hence no node is exploited in the long run. Complete details regarding how "smart" plans are generated and constraints are maintained are described in further detail herein. The node, upon receiving the plan from the server, pairs-up with neighbors and forms a group (e.g., an XTrack-group) as defined in the plan. Each node in the group takes turns as per the ordering and contribution factor present in the plan and begins live tracking operations and logging the location(s) of the group. How the nodes interact with each other and maintain integrity of the group is discussed in further detail herein.

FIG. 1 illustrates a block diagram depicting the high-level architecture of a system 10 that includes one or more nodes capable of forming groups and interacting with the aforementioned server, in accordance with an example embodiment. System 10 includes a server 27 (e.g., an XTrack server) that includes a server agent 36 (e.g., an XTrack server agent) that facilitates a trip planner 28 that can provide data such as, for example, a trip context 34, a route profile 32, and a user profile 30.

A group 15 (e.g., XTrack group) is shown in FIG. 1 as including a group of commuter devices 1 . . . n associated respectively with commuters (users) 1 . . . n. For example, a first commuter device 6 (e.g., a smartphone, a tablet computing device, etc.) can include a BLE sync agent 18, a node 14, a trip planner client application 12, and a GPS module 16. The $n^{th}$ commuter device 8 similarly includes a BLE sync agent 26, a GPS module 24, a node 22, and a trip planner client application 20. The nodes 14 and 22 can communicate with the server agent 36 of the server 27. The server 27 can generate real-time context information 43 including, but not limited to traffic information 42, social network feeds 40, and city information 38 (e.g. "CityZen" data).

Note that most recent public transportation vehicles are equipped with GPS units installed for live tracking of such vehicles. In an example embodiment, such GPS units can be altered to broadcast live location data via BLE communications, thereby enabling such units to act as a centralized location provider. Thus, the group 15 can leverage the presence of such a centralized location provider to further optimize its location tracking by avoiding a computationally intensive location finding process. If a centralized GPS is present, then the group 15 can grab a location from it and take turns as per the plan to only send this information to the server 27. In case of the absence of a centralized location provider, the node that is connected to a power source can optionally volunteer to function as a centralized location provider, as power drain does not matter for that particular node.

Figure 2:
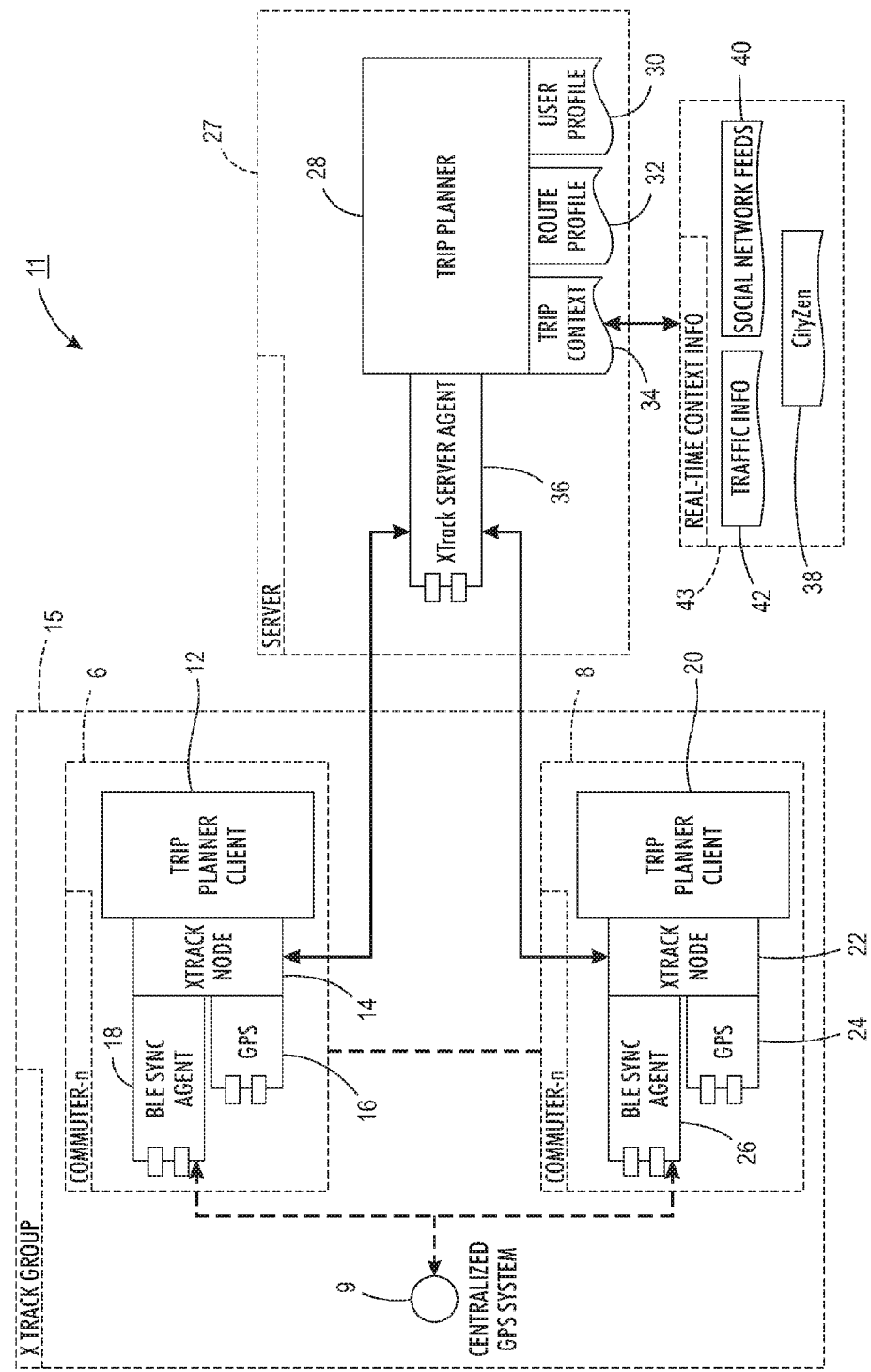
FIG. 2 illustrates a block diagram depicting the high-level architecture of a system similar to that shown in FIG. 1, but including a centralized GPS system, in accordance with an example embodiment.

FIG. 2 illustrates a block diagram depicting the high-level architecture of a system 11 similar to the system 10 shown in FIG. 1, but includes a centralized GPS system 9, in accordance with an example embodiment. Note that identical or similar parts or elements are shown in FIGS. 1-2. In the example depicted in FIG. 2, the centralized GPS system 9 can communicate with the BLE sync agent 18 of commuter device 6 and the BLE sync agent 26 of commuter device 8.

Note that location services can be implemented for different apps. The systems 10 and 11 shown FIGS. 1-2 can be utilized in the context of a module that is invoked by an "app" when location information is required by the app. Based on the approaches shown in FIGS. 1-2, an app can be configured, which maintains the latest location update and in case a request for the location is needed, the app can in turn query location services available. Thus, the number of direct requests to power hungry location services modules can be minimized.

Figure 3:
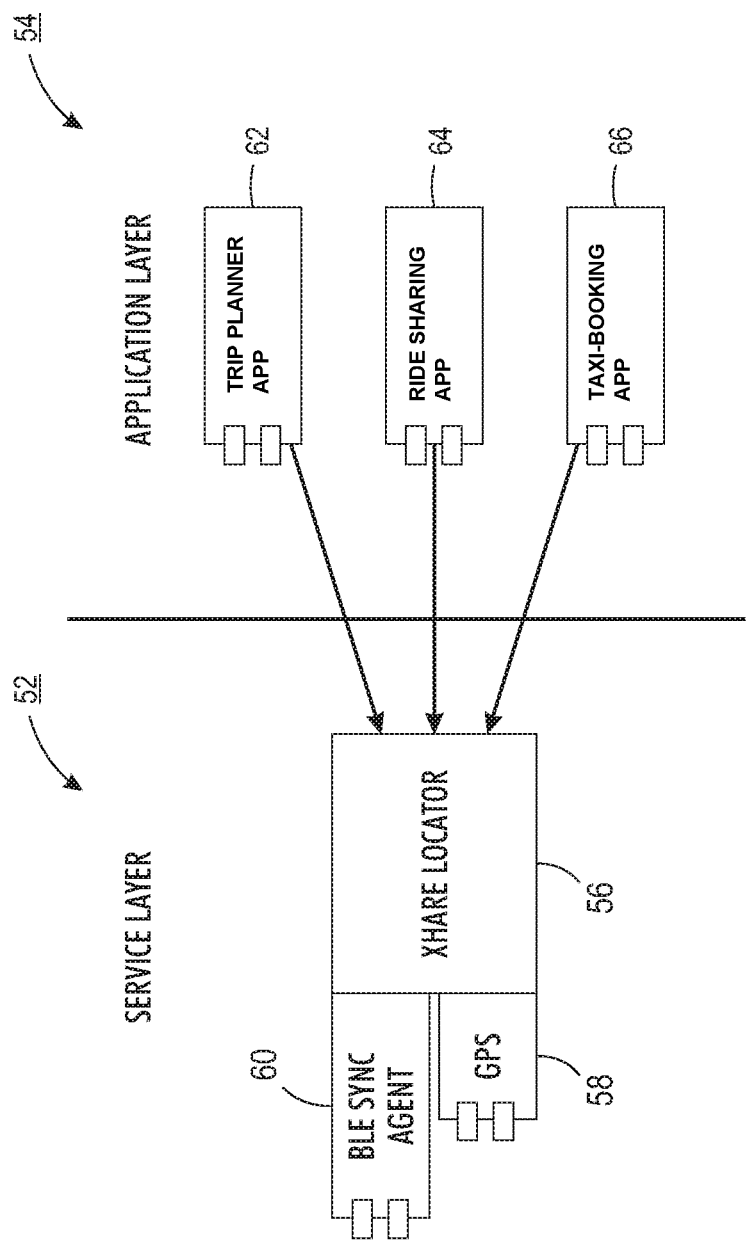
FIG. 3 illustrates a block diagram of a service layer component with respect to an application layer and allocation, which can receive a request for a current location, in accordance with an example embodiment.

FIG. 3 illustrates a block diagram of a service layer component 52 with respect to an application layer 54 and allocation, which can receive a request for a current location, in accordance with an example embodiment. The service layer 52 comprises, for example, a BLE sync agent such as BLE sync agent 60, a service locator application 56, and a GPS unit or module 58. The application layer 54 in this example includes a trip planner app 62, a ride sharing app 64 (e.g., Uber, Lyft, etc.), and a taxi-booking app 66. Note that as utilized herein the term app can refer to a self-contained program or piece of software designed to fulfill a particular purpose; an application, especially as downloaded by a user to a mobile device. The term app can also in some embodiments refer to a mobile app, which is a specific type of computer program designed to run on mobile devices such as smartphones and tablet computers.

The server 27 depicted in FIGS. 1-2 is a server component of the system 10, 11 (e.g., XTrack system), which is responsible for finding the best group for a node, generating a list of tracking checkpoints, and creating a smart group tracking plan for the group. As soon as a node such as node 14 or 22 sends a list of neighboring nodes/groups, the server 27 can select the best group for the node to join using the trip plans. The best group is the group that shares a maximum common distance with the node in the current leg of the journey. Once a group such as group 15 is formed, the server 27 can create a unified plan for the current leg of the journey that all the nodes (e.g., nodes 14, 22) in the group have in common. Then, the server 27 can calculate the ABP (Affordable Battery Power) for each individual device (e.g., commuter devices 6, 8, etc.) in the group (e.g., group 15). The ABP is the amount of battery power that a node can afford for this particular leg of the journey. ABP can be calculated as follows:

$$ABP = \frac{BP * T_{leg}}{T_{trip}}$$

where BP is amount of batter power that the node has, $T_{leg}$ is the time to complete the current leg of the journey, and $T_{trip}$ is the time to complete the entire trip.

The server 27 can then calculate the LF (Load Factor) for each node. The LF determines the workload that each node has to contribute to the group. For effective usage of battery power in the participating nodes, the server 27 uses an ABP constraint and an SRC (System Rationality Constraint) to calculate LF. The ABP constraint states that the LF should be distributed in proportion to the ABP. That is, the node with the lesser ABP is given less work than a node with a larger ABP in the group. Thus, in a group, a node with a larger ABP can compensate for a node with a lesser ABP by contributing more to the group.

The SRC states that a node that contributes more to one group by taking up more workload should be compensated in another group by giving a lesser workload. To ensure that SRC is maintained, the system (e.g., systems 10, 11) can capture the amount of contributions made by each node using a factor called a CF (Contribution Factor). The system can continuously record the contribution made by each node to a group ($CF_{group}$) and accumulates it to the trip level ($CF_{trip}$ and node level ($CF_{node}$)). The amount of contribution that a node makes to each group is calculated as follows:

$$CF_{group} = (N_{gps}*\alpha_{gps} + N_{data}*\alpha_{data} + T_{Master}*\alpha_{Master})*Size_{Group}*\eta$$

where $N_{gps}$ is the number of GPS traces made, $N_{data}$ is the number of data requests sent, $T_{Master}$ is the amount of time spent as master of the group, $Size_{Group}$ is the size of the group, $\alpha$ is the contribution factor for each kind of action, and $\eta$ is the normalized overhead factor for each additional member in the group.

The contribution factor of the node for the entire trip ($CF_{trip}$) can be calculated as the summation over the $CF_{group}$ of each group that the node had involved in the trip. The overall contribution factor of the node ($CF_{node}$) to the system can be calculated as summation over $CF_{trip}$ of all the trips the node has participated in the system so far.

$$CF_{trip} = \sum_{group \in trip} CF_{group}$$

$$CF_{node} = \sum_{trip \in node} CF_{trip}$$

As per SRC, the LF (Load Factor) should be inversely proportional to $CF_{node}$ so that a node that contributed more to the system in the past will contribute less now. A node's contribution in the current trip should have a slightly higher weight over historic contribution. Hence, the normalized contribution factor $CF_{norm}$ can be defined as a weighted summation over $CF_{currenttrip}$ and $CF_{node}$ as follows:

$$CF_{norm} = \beta_1 * CF_{node} + \beta_2 * CF_{currenttrip} \text{ where } \beta_1 + \beta_2 = 1$$

In the equation above, $\beta_1$ is the weight of historic contribution of the node to the system, $\beta_2$ is the weight of contribution of the node to the current trip, and $CF_{currenttrip}$ is the contribution factor of the node for the trip under consideration.

Considering both the ABP constraint and the SRC, LF can be calculated from $CF_{norm}$ and ABP as follows:

$$LF = \frac{ABP}{(CF_{norm} + \gamma)}$$

where $\gamma$ is the system defined to skew the ABP to $CF_{norm}$ ratio.

Using the unified trip plan of the group, the derived LF (Load Factor) for each node and real-time contextual information such as road traffic data and on-demand services, the server 27 can create Tracking Rules (T-Rules) for the group. The T-Rules specify the time intervals and strategic location points that the group 15, for example, can use to update its location to the server 27. In addition, the server 27 can determine a clear ordering in which nodes should contribute as a master to the group, based on the LF. The T-Rules along with ordering can be composed as a "smart" tracking plan and sent to the node.

Note that the nodes 14, 22 can be implemented as the mobile component of the system (present in the commuter's mobile device (e.g., smartphone, tablet computing device)) that is responsible for finding neighboring nodes, forming a group such as group 15, maintaining the integrity of the group, diligently following the tracking plan, and acting as a group master in turn as per the plan. The nodes 14, 22 can utilize BLE technology to interact with peer nodes as it provides needed power efficiency and the range of communications. Each node takes turn and can act as a master, as per the ordering given by server in the tracking plan.

Figure 4:
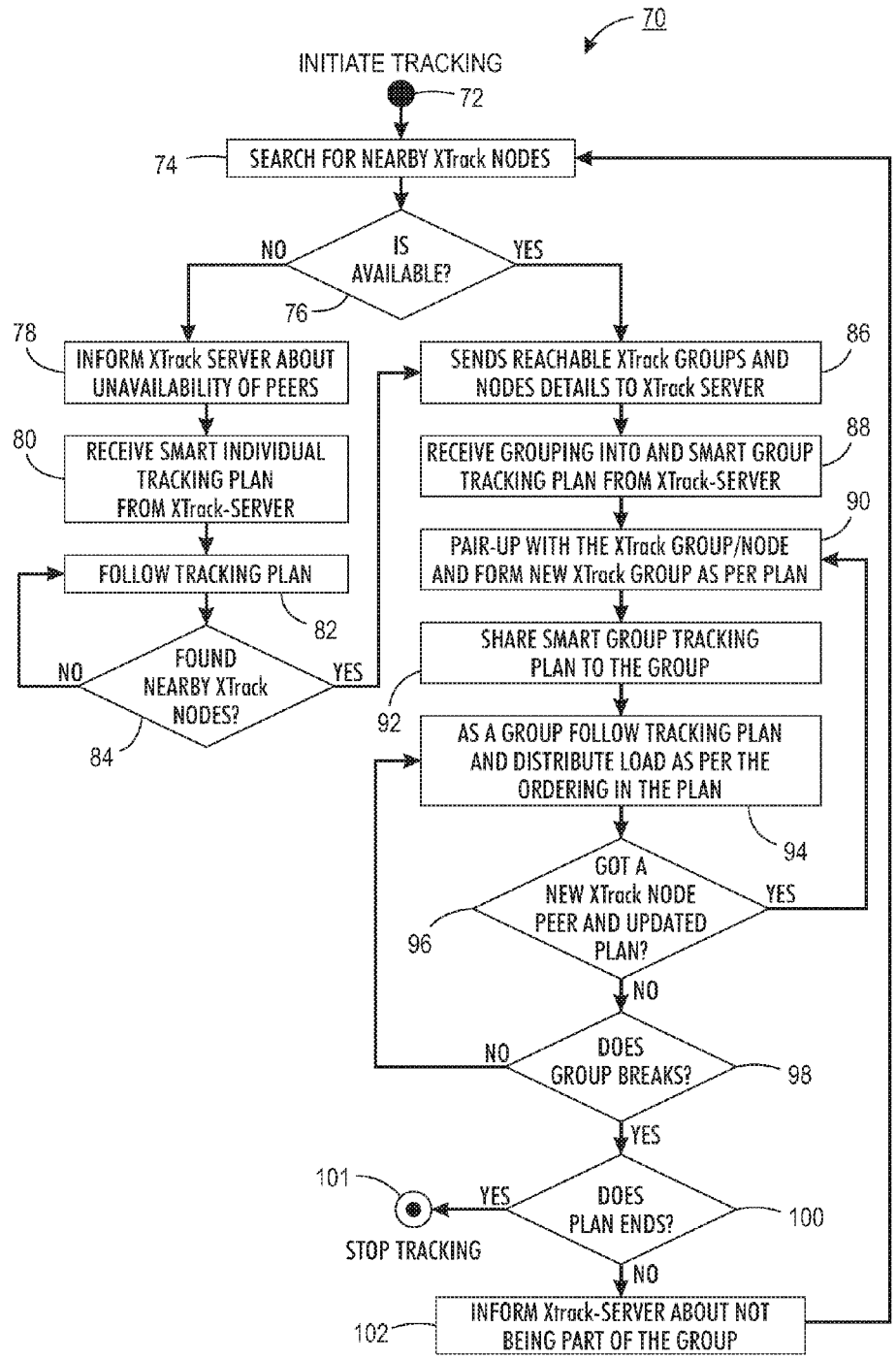
FIG. 4 illustrates a high-level flow of operations depicting a method of actions capable of being performed by a node, in accordance with an example embodiment.

FIG. 4 illustrates a high-level flow of operations depicting a method of actions capable of being performed by a node such as nodes 14, 22, in accordance with an example embodiment. As indicated at block 72, tracking operations can be initiated. Thereafter, as shown at block 74, a step or operation (e.g., instructions) can be implemented to search for nearby nodes. Next, as shown at decision block 76, a test can be performed to determine if a node is available. If not, then the steps or operations depicted at blocks 78, 80, 82, and 84 can be implemented. That is, depicted at block 78, a step or operation can be implemented to inform the server 27 about the unavailability of peers. Then, as described at block 80, a step or operation can be implemented to receive a "smart" individual tracking plan from the server 27. Thereafter, as illustrated at block 82, a step or operation can be implemented to follow the tracking plan. Then, as depicted at decision block 84, a test can be implemented to find nearby nodes. If nodes are not found, then the operation shown at block 82 is repeated and so on. If a node is found, then the operations shown beginning with block 86 can be implemented.

Assuming the answer is "yes" with respect to the operations described at blocks 76 or 84, an operation can be implemented, as shown at block 86, in which data regarding reachable groups and node(s) details are sent to the server 27. Then, as shown at block 88, a step or operation can be implemented to receive group information (data about a group or groups) and the smart tracking plan from the server 27. Next, a step or operation can be performed as shown as indicated at block 90 to pair-up with the group/node and form a new group as per the plan. Thereafter, as depicted at block 92, a step or operation can be performed to share the smart group-tracking plan with the group. Then, as described at block 94, a step or operation can be implemented wherein as a group, the tracking plan is followed and the load distributed per the ordering in the plan.

Next, as shown at decision block 96, a test can be performed to determine if a new node peer has been obtained and an updated plan implemented. Then, as depicted at decision block 98, a test can be performed to determine if the group has broken up. Thereafter, as described at decision block 100, a test can be performed to determine if the plan has ended. If so, the tracking operations are stopped, as shown at block 101. If not, then, as indicated at block 102, a step or operation can be implemented to inform the server 27 about not being a part of the group. Following processing of the operation shown at block 102, the operations beginning with the step or operation illustrated at block 74 can be implemented, and so on.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the users computer, partly on the users computer, as a stand-alone software package, partly on the user's computer and partly on a remote computer, or entirely on the remote computer. In the latter scenario, the remote computer may be connected to a users computer through a local area network (LAN) or a wide area network (WAN), wireless data network e.g., Wi-Fi, Wimax, 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 5:
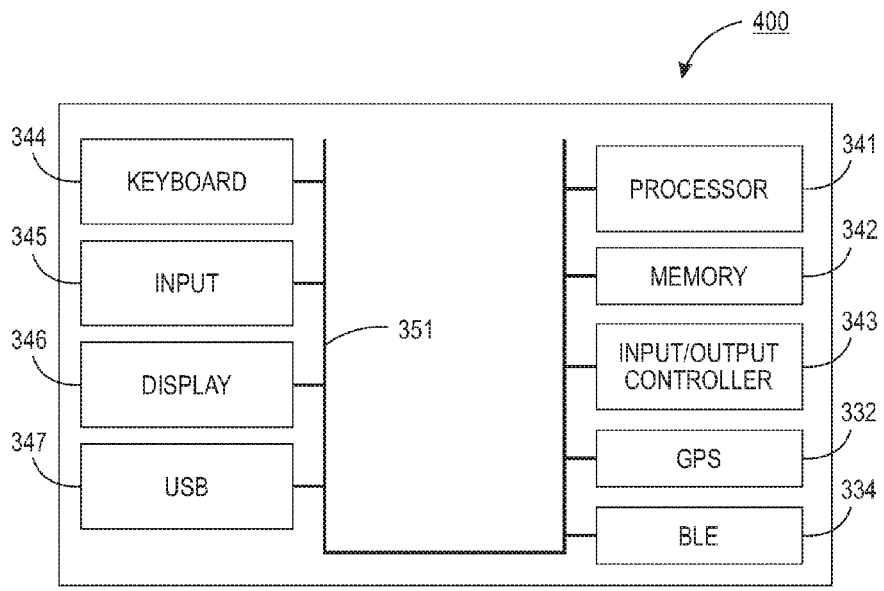
FIG. 5 illustrates a schematic view of a computer system, in accordance with an example embodiment.
Figure 6:
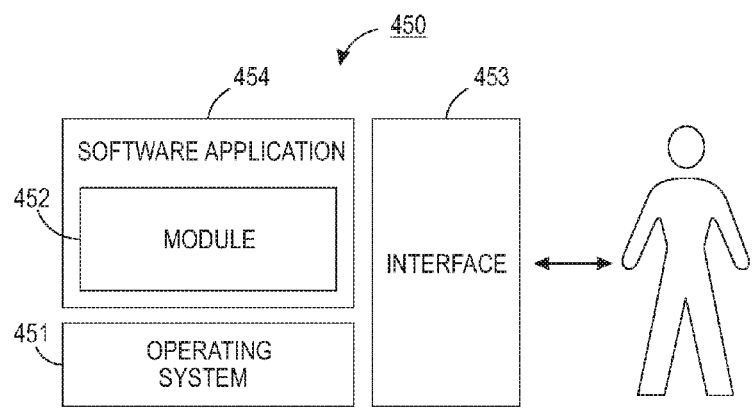
FIG. 6 illustrates a schematic view of a software system including a module, an operating system, and a user interface, in accordance with an example embodiment.

FIGS. 5-6 are shown only as exemplary diagrams of data-processing environments in which embodiments may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, some embodiments may be implemented in the context of a data-processing system 400 which may be, for example, a client-computing device (e.g., a client PC, laptop, tablet computing device, etc.) that communicates with peripheral devices (not shown) via a client-server network (e.g., wireless and/or wired). In other embodiments, data-processing system 400 may functions as a server in the context of such a client-server network.

The example data-processing system 400 shown in FIG. 5 can include a system bus 351 and one or more processors such as processor 341 (e.g., a CPU or Central Processing Unit), a memory 342 (e.g., random access memory and/or other types of memory components), a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association with the keyboard 344, etc.), a display 346, and in some cases, a GPS module 332, which may be a hardware and/or software-based device. Note that the keyboard 344 may be in some embodiments, a graphically displayed touch screen keyboard such as those displayed via smartphones, tablet computing devices, and so on. Note that the GPS module 332 is analogous to the GPS modules 16 and 24 shown in FIGS. 1-2. A BLE module 334 can also be connected to the system bus 351. The BLE module 334 can implement the BLE sync agents 18, 26 shown in FIGS. 1-2.

As illustrated, the various components of data-processing system 400 can communicate electronically through the system bus 351 or similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a tablet computing device, a server, and so on.

FIG. 6 illustrates a computer software system 450 for directing the operation of the data-processing system 400 shown in FIG. 5. Software application 454 stored, for example, in memory 342 generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as module 452, which can, for example, implement instructions or operations such as those described herein. Examples of instructions that can be implemented by module 452 include steps or operations such as those shown and described herein with respect to the various steps or operations of method 70 shown in FIG. 4.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application stored in a memory such as, for example, memory 342. However, a module may also be composed of, for example, electronic and/or computer hardware or such hardware in combination with software. In some cases, a "module" can also constitute a database and/or electronic hardware and software that interact with the database. The GPS modules 16, 24 shown in FIG. 1 and GPS module 332 may be implemented as, for example, a hardware component or a combination of hardware and software.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. A module can also be composed of other modules or sub-modules.

FIGS. 5-6 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Based on the foregoing, it can be appreciated that a number of example embodiments are disclosed herein. For example, in one embodiment, a method for collaborative location tracking can be implemented (e.g., via a data-processing or computer system). Such a method can include steps or operations such as, for example, grouping a plurality of commuters into a group according to a plurality of commuter client devices respectively associated with the plurality of commuters; and tracking the plurality of commuter client devices as a group rather than individually and based on power efficient context-aware location data derived from the plurality of commuter client devices and a generated trip plan in association with data indicative of real-time dynamics so that a power usage of individual commuter client devices among the plurality of commuter client devices is rationally minimized.

In another embodiment, steps or operations can be implemented for identifying at least one node within the group; and providing a location of the at least one node to at least one other node within the group. In yet another example embodiment, steps or operations can be provided for deriving GPS location data from a GPS system associated with a public transportation vehicle, and sharing the location data among the plurality of commuter client devices.

In another embodiment, a step or operation can be provided for creating a list of strategic tracking checkpoints for the group based on the power efficient context-aware location data, wherein the group tracks and logs locations of the groups at the checkpoints in the list of strategic tracking checkpoints rather than continuously. In still another example embodiment, the step or operation of tracking the plurality of commuter client devices as a group can further include a step or operation for tracking the plurality of commuter client devices utilizing a server that generates optimal grouping data and tracking data for the plurality of commuters.

In some example embodiments, the at least one node can be a mobile component of a mobile computing device, wherein the at least one node creates an ad-hoc group among the plurality of commuters and implements an optimal tracking plan provided by the server, the optimal tracking plan including the generated trip plan.

In another example embodiment, a system for collaborative location tracking can include at least one processor and a computer-usable medium embodying computer program code, the computer-usable medium capable of communicating with the at least one processor. The computer program code can include instructions executable by the at least one processor and configured, for example, for: grouping a plurality of commuters into a group according to a plurality of commuter client devices respectively associated with the plurality of commuters; and tracking the plurality of commuter client devices as a group rather than individually and based on power efficient context-aware location data derived from the plurality of commuter client devices and a generated trip plan in association with data indicative of real-time dynamics so that a power usage of individual commuter client devices among the plurality of commuter client devices is rationally minimized.

In another example embodiment, such instructions can be further configured for identifying at least one node within the group; and providing a location of the at least one node to at least one other node within the group. In yet another example embodiment, such instructions can be further configured for deriving GPS location data from a GPS system associated with a public transportation vehicle; and sharing the location data among the plurality of commuter client devices.

In still another example embodiment, such instructions can be further configured for creating a list of strategic tracking checkpoints for the group based on the power efficient context-aware location data, wherein the group tracks and logs locations of the groups at the checkpoints in the list of strategic tracking checkpoints rather than continuously. In still another embodiment, the aforementioned instructions for tracking the plurality of commuter client devices as a group can be further configured to include instructions for tracking the plurality of commuter client devices utilizing a server that generates optimal grouping data and tracking data for the plurality of commuters.

In some example system embodiments, the at least one node can include a mobile component of a mobile computing device, wherein the at least one node creates an ad-hoc group among the plurality of commuters and implements an optimal tracking plan provided by the server, the optimal tracking plan including the generated trip plan.

In still another example embodiment, a non-transitory processor-readable medium can store computer code representing instructions to cause a process for collaborative location tracking. Such computer code can include code to: group a plurality of commuters into a group according to a plurality of commuter client devices respectively associated with the plurality of commuters; and track the plurality of commuter client devices as a group rather than individually and based on power efficient context-aware location data derived from the plurality of commuter client devices and a generated trip plan in association with data indicative of real-time dynamics so that a power usage of individual commuter client devices among the plurality of commuter client devices is rationally minimized.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for collaborative location tracking, comprising:
   grouping a plurality of commuters into a group with at least one server according to a plurality of commuter client devices respectively associated with said plurality of commuters; and
   tracking with said at least one server said plurality of commuter client devices as said group rather than individually and based on power efficient context-aware location data derived from said plurality of commuter client devices and a generated trip plan in association with data indicative of real-time dynamics so that a power usage of individual commuter client devices among said plurality of commuter client devices is rationally minimized, wherein said generated trip plan is generated by said at least one server.

2. The method of claim 1 further comprising:
   identifying at least one node within said group; and
   providing a location of said at least one node to at least one other node within said group.

3. The method of claim 1 further comprising:
   deriving GPS location data from a GPS system associated with a public transportation vehicle; and
   sharing said location data among said plurality of commuter client devices.

4. The method of claim 1 further comprising creating a list of strategic tracking checkpoints for said group based on said power efficient context-aware location data, wherein said group tracks and logs locations of said groups at said checkpoints in said list of strategic tracking checkpoints rather than continuously.

5. The method of claim 1 wherein said tracking with said at least one server said plurality of commuter client devices as said group, further comprises:
   tracking said plurality of commuter client devices utilizing said at least one server, which generates optimal grouping data and tracking data for said plurality of commuters.

6. The method of claim 2 wherein said at least one node comprises a mobile component of a mobile computing device, wherein said at least one node creates an ad-hoc group among said plurality of commuters and implements an optimal tracking plan provided by said server, said optimal tracking plan including said generated trip plan.

7. The method of claim 6 wherein said tracking with said at least one server said plurality of commuter client devices as said group, further comprises:
   tracking said plurality of commuter client devices utilizing said at least one server, which generates optimal grouping data and tracking data for said plurality of commuters.

8. A system for collaborative location tracking, comprising:
- at least one processor; and
- a non-transitory computer-usable medium embodying computer program code, said computer-usable medium capable of communicating with said at least one processor, said computer program code comprising instructions executable by said at least one processor and configured for:
  - grouping a plurality of commuters into a group with at least one server according to a plurality of commuter client devices respectively associated with said plurality of commuters; and
  - tracking said plurality of commuter client devices with said at least one server as said group rather than individually and based on power efficient context-aware location data derived from said plurality of commuter client devices and a generated trip plan in association with data indicative of real-time dynamics so that a power usage of individual commuter client devices among said plurality of commuter client devices is rationally minimized wherein said generated trio plan is generated by said at least one server.

9. The system of claim 8 wherein said instructions are further configured for:
- identifying at least one node within said group; and
- providing a location of said at least one node to at least one other node within said group.

10. The system of claim 8 wherein said instructions are further configured for:
- deriving GPS location data from a GPS system associated with a public transportation vehicle; and
- sharing said location data among said plurality of commuter client devices.

11. The system of claim 8 wherein said instructions are further configured for creating a list of strategic tracking checkpoints for said group based on said power efficient context-aware location data, wherein said group tracks and logs locations of said groups at said checkpoints in said list of strategic tracking checkpoints rather than continuously.

12. The system of claim 8 wherein said instructions for tracking with said at least one server said plurality of commuter client devices as said group are further configured to include instructions for:
- tracking said plurality of commuter client devices utilizing said at least one server, which generates optimal grouping data and tracking data for said plurality of commuters.

13. The system of claim 9 wherein said at least one node comprises a mobile component of a mobile computing device, wherein said at least one node creates an ad-hoc group among said plurality of commuters, and implements an optimal tracking plan provided by said server, said optimal tracking plan including said generated trip plan.

14. The system of claim 9 wherein said instructions for tracking said plurality of commuter client devices as said group are further configured to include instructions for:
- tracking said plurality of commuter client devices utilizing a server that generates optimal grouping data and tracking data for said plurality of commuters.

15. A non-transitory processor-readable medium storing computer code representing instructions to cause a process for collaborative location tracking, said computer code comprising code to:
- group a plurality of commuters into a group with at least one server according to a plurality of commuter client devices respectively associated with said plurality of commuters; and
- track said plurality of commuter client devices with said at least one server as said group rather than individually and based on power efficient context-aware location data derived from said plurality of commuter client devices and a generated trip plan in association with data indicative of real-time dynamics so that a power usage of individual commuter client devices among said plurality of commuter client devices is rationally minimized, wherein said generated trip plan is generated by said at least one server.

16. The processor-readable medium of claim 15 wherein said code further includes code to:
- identify at least one node within said group; and
- provide a location of said at least one node to at least one other node within said group.

17. The processor-readable medium of claim 15 wherein said code further includes code to:
- derive GPS location data from a GPS system associated with a public transportation vehicle; and
- share said location data among said plurality of commuter client devices.

18. The processor-readable medium of claim 15 wherein said code further includes code to create a list of strategic tracking checkpoints for said group based on said power efficient context-aware location data, wherein said group tracks and logs locations of said groups at said checkpoints in said list of strategic tracking checkpoints rather than continuously.

19. The processor-readable medium of claim 15 wherein said code to track with said at least one server said plurality of commuter client devices as said group, further includes code to:
- track said plurality of commuter client devices utilizing said at least one server, which generates optimal grouping data and tracking data for said plurality of commuters.

20. The processor-readable medium of claim 19 wherein said at least one node comprises a mobile component of a mobile computing device, wherein said at least one node creates an ad-hoc group among said plurality of commuters and implements an optimal tracking plan provided by said server, said optimal tracking plan including said generated trip plan.

* * * * *